United States Patent
Cui et al.

(10) Patent No.: US 10,999,345 B2
(45) Date of Patent: May 4, 2021

(54) REAL-TIME VIDEO DELIVERY FOR CONNECTED HOME APPLICATIONS

(71) Applicants: AT&T Intellectual Property I, L.P., Atlanta, GA (US); AT&T Mobility II LLC, Atlanta, GA (US)

(72) Inventors: Zhi Cui, Sugar Hill, GA (US); Jing Wu, Johns Creek, GA (US); Bo Lee, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 292 days.

(21) Appl. No.: 14/886,410

(22) Filed: Oct. 19, 2015

(65) Prior Publication Data

US 2017/0111423 A1    Apr. 20, 2017

(51) Int. Cl.
*H04L 29/06* (2006.01)
*H04L 12/28* (2006.01)
(Continued)

(52) U.S. Cl.
CPC ........ *H04L 65/608* (2013.01); *H04L 12/2803* (2013.01); *H04L 41/0668* (2013.01);
(Continued)

(58) Field of Classification Search
CPC ... H04L 65/608; H04L 12/2803; H04L 65/80; H04L 43/0817; H04N 21/44227;
(Continued)

(56) References Cited

U.S. PATENT DOCUMENTS 7,447,507 B1   11/2008  Infosino
7,496,674 B2   2/2009   Jorgensen
(Continued)

OTHER PUBLICATIONS

Kokate et al., "Android Application to Recommend Home Security Threats," International Journal of Engineering Technology and Management, 2014, vol. 2, Issue 2, pp. 86-89.
(Continued)

*Primary Examiner* — Chris Parry
*Assistant Examiner* — Weiwei Y Stiltner
(74) *Attorney, Agent, or Firm* — Hartman & Citrin LLC

(57) ABSTRACT

Concepts and technologies disclosed herein are directed to real-time video delivery for connected home ("CH") applications. According to one aspect of the concepts and technologies, a CH controller ("CHC") can receive a request for delivery of a video stream captured by a CH video camera to a user device. The CHC can determine availability of a wireline communications link to a wireline network and availability of a wireless communications link to a wireless network over which to deliver the video stream to the user device. In response to determining that the wireline communications link and the wireless communications link are available, the CHC can obtain a wireline performance measurement for the wireline communications link, obtain a wireless performance measurement for the wireline communications link, compare the wireline performance measurement and the wireless performance measurement, and select either the wireline communications link or the wireless communications link based upon the comparison.

20 Claims, 4 Drawing Sheets

(51) Int. Cl.
  *H04N 21/4223* (2011.01)
  *H04N 21/436* (2011.01)
  *H04N 21/4363* (2011.01)
  *H04N 21/442* (2011.01)
  *H04L 12/26* (2006.01)
  *H04L 12/24* (2006.01)

(52) U.S. Cl.
  CPC .......... *H04L 43/0811* (2013.01); *H04L 65/80* (2013.01); *H04N 21/4223* (2013.01); *H04N 21/43615* (2013.01); *H04N 21/43632* (2013.01); *H04N 21/43637* (2013.01); *H04N 21/44227* (2013.01)

(58) Field of Classification Search
  CPC ....... H04N 21/43632; H04N 21/43637; H04N 21/43615; H04N 21/4223
  USPC ......................................................... 709/219
  See application file for complete search history.

(56) References Cited

U.S. PATENT DOCUMENTS

| | | | |
|---|---|---|---|
| 8,375,118 B2 | 2/2013 | Hao et al. | |
| 8,593,995 B1 | 11/2013 | Christie, IV | |
| 8,848,609 B2 | 9/2014 | Hsiao et al. | |
| 9,059,863 B2 | 6/2015 | Baum et al. | |
| 9,118,968 B2 | 8/2015 | Perlman et al. | |
| 2002/0099854 A1* | 7/2002 | Jorgensen | H04L 29/06 709/249 |
| 2006/0282855 A1* | 12/2006 | Margulis | H04N 5/44591 725/43 |
| 2007/0206497 A1* | 9/2007 | Plamondon | H04L 1/1887 370/231 |
| 2008/0259888 A1* | 10/2008 | Terashima | H04B 3/54 370/338 |
| 2008/0288986 A1* | 11/2008 | Foster | G08B 13/19656 725/62 |
| 2009/0116384 A1* | 5/2009 | Kim | H04L 47/823 370/230 |
| 2009/0322550 A1 | 12/2009 | Yu | |
| 2010/0142542 A1* | 6/2010 | Van Wie | H04L 65/1073 370/400 |
| 2010/0251056 A1* | 9/2010 | Dinan | H04L 1/1812 714/749 |
| 2012/0100854 A1* | 4/2012 | Hanaoka | H04W 72/0453 455/436 |
| 2012/0250547 A1* | 10/2012 | Fujita | H04W 4/06 370/252 |
| 2012/0257535 A1* | 10/2012 | DeWath | H04L 43/0876 370/253 |
| 2012/0274791 A1 | 11/2012 | Thomas et al. | |
| 2013/0022132 A1* | 1/2013 | Paulsen | H04B 3/54 375/257 |
| 2013/0091239 A1* | 4/2013 | Hao | H04L 29/06326 709/217 |
| 2013/0094359 A1* | 4/2013 | Kim | H04L 47/805 370/231 |
| 2013/0100884 A1* | 4/2013 | King | H04W 84/14 370/328 |
| 2013/0117685 A1* | 5/2013 | Jang | H04N 21/231 715/744 |
| 2013/0121311 A1* | 5/2013 | Shen | H04W 36/14 370/331 |
| 2013/0250755 A1* | 9/2013 | Clark | H04L 69/40 370/228 |
| 2013/0308437 A1* | 11/2013 | Hayakawa | H04W 24/04 370/216 |
| 2013/0346630 A1 | 12/2013 | Oh et al. | |
| 2014/0258552 A1* | 9/2014 | Oyman | H04N 19/146 709/231 |
| 2014/0313117 A1 | 10/2014 | Addy et al. | |
| 2015/0022666 A1* | 1/2015 | Kay | H04L 67/025 348/159 |
| 2015/0312142 A1* | 10/2015 | Barabash | H04L 45/42 370/400 |
| 2016/0337224 A1* | 11/2016 | Afkhami | H04L 43/10 |
| 2017/0064412 A1* | 3/2017 | Taxier | H04N 21/8133 |
| 2017/0078767 A1* | 3/2017 | Borel | H04N 21/8549 |

OTHER PUBLICATIONS

Ballantyne et al., "Autoconfiguration for Faster WiFi Community Networks," 2015, IFIP/IEEE International Symposium on Integrated Network Management (IM), 2015.

Egilmez et al., "A Distributed QOS Routing Architecture for Scalable Video Streaming Over Multi-Domain Openflow Networks," 2012 19th IEEE International Conference on Image Processing (ICIP), 2012.

* cited by examiner

REAL-TIME VIDEO DELIVERY FOR CONNECTED HOME APPLICATIONS

BACKGROUND

Connected homes, also known as smart homes, are homes equipped with technology that allows users to control and interact with various aspects of their home. Connected home services bring convenience to users not previously available. For instance, a connected home service such as AT&T DIGITAL LIFE can initiate recording of video when a person is detected at the front door of a user's home and can send to the user's device (e.g., a smartphone) the video so that the user can identify who is at the front door.

DETAILED DESCRIPTION

Figure 1:
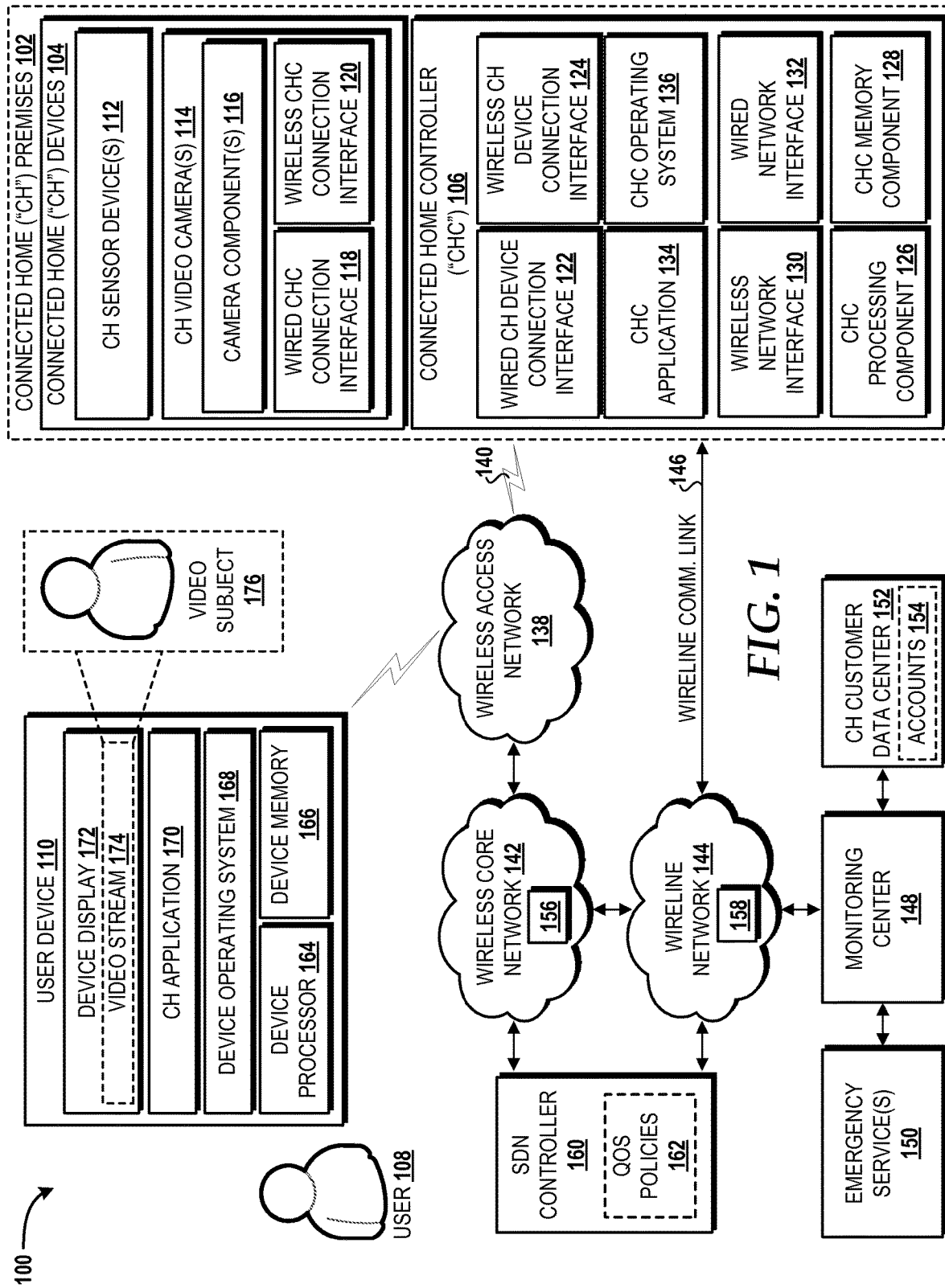
FIG. 1 is a block diagram illustrating aspects of an illustrative operating environment for various concepts disclosed herein.

The current state of the art technology for video delivery services uses Hypertext Transfer Protocol ("HTTP") and Transfer Control Protocol ("TCP") instead of User Datagram Protocol ("UDP") because UDP video streams are often blocked by networks or the network end points for various reasons such as security. TCP is the most widely adopted network transport protocol. TCP is proven to work well for wired networks. However, TCP retransmission becomes an issue when utilized on wireless networks. Slow-start is part of the congestion control strategy used by TCP. Slow-start assumes that unacknowledged packets are due to network congestion. While this is an acceptable assumption for wireline networks, packets might be lost for other reasons such as poor radio frequency ("RF") quality in wireless networks. Thus, slow-start can perform poorly in situations with poor reception in wireless networks.

When data/video TCP packets or TCP acknowledgement incurs error or loss in wireless networks, slow-start and/or retransmission can be triggered. This results in degradation of the end user experience and wasting valuable radio and network bandwidth due to frequent retransmission. Currently, the TCP protocol is not flexible in terms of supporting different types of applications, such as, for example, real-time streaming protocol ("RTSP") versus buffered streaming protocol on different networks. All applications share the same attribute settings for slow-start and retransmission triggers.

The limited Quality of Service ("QoS") capability in existing radio networks also contributes to the problem. For instance, Long-Term Evolution ("LTE") has up to nine QoS Class Identifiers ("QCIs"), which correspond to nine priorities for packet handling. Service providers often times group different traffic types into one priority. As a result, QoS treatment in wireless networks is very coarse. A more granular QoS treatment is more desirable, particularly in certain situations such as emergency events.

Concepts and technologies disclosed herein are directed to real-time video delivery for connected home ("CH") applications. Real-time can be measured in milliseconds/microseconds and is the responsiveness used to support the low timing threshold for applications such as video streaming. According to one aspect disclosed herein, a new capability is provided for a CH controller ("CHC") to detect wireline network and wireless network availability and to dynamically select the best access technology to utilize for delivery of a video stream captured by a CH video camera under the control of the CHC. For example, the wireline network can be selected by default. However, when a wireline communications link to the wireline network is compromised, such as in the event of a robbery in which the link is severed or otherwise rendered inoperable, the CHC can detect the failure and can select a wireless communications link to the wireless network as a backup.

According to another aspect disclosed herein, video delivery can take advantage of more flexible and more granular Quality of Service ("QoS") treatment provided by Software-Defined Networking ("SDN") concepts. These more granular QoS treatments can be utilized to reduce the occurrence of Transfer Control Protocol ("TCP") retransmission, and as a result, can save operator network bandwidth and improve delay performance. Moreover, TCP profiles can be created to allow per network (e.g., wired vs. wireless) and per application or group of applications treatment. These TCP profiles can be used to minimize unnecessary TCP retransmission on a particular type of TCP video delivery and slow-start to improve network bandwidth utilization and to reduce the latency of the video delivery to improve user experience.

According to one aspect disclosed herein, a CHC includes a wireless network interface, a wired network interface, a CH device connection interface, a processor, and a memory. The wireless network interface connects the CHC to a wireless access network. The wired network interface connects the CHC to a wired access network. The CH device connection interface connects the CHC to a CH video camera. The processor executes instructions stored in the memory to cause the CHC to perform operations. In particular, the CHC can receive a request for delivery of a video stream captured by the CH video camera to a user device. The CHC can determine availability of a wireline communications link to the wireline network over which to deliver the video stream to the user device. The CHC can determine availability of a wireless communications link to the wireless network over which to deliver the video stream to the user device. In response to determining that the wireline communications link and the wireless communications link are available, the CHC can obtain a wireline performance measurement for the wireline communications link and a wireless performance measurement for the wireless communications link, can compare the wireline performance measurement and the wireless performance measurement, and can select either the wireline communications link or the wireless communications link based upon the comparison.

In some embodiments, the CHC can determine availability of the wireline communications link to the wireline network over which to deliver the video stream to the user device in response to receiving the request for delivery of the video stream to the user device. In some embodiments, the CHC can determine availability of the wireless communications link to the wireless network over which to deliver the video stream to the user device in response to receiving the request for delivery of the video stream to the user device.

In some embodiments, the CHC can receive the request for delivery of the video stream to the user device in response to an event detected by a CH sensor device. In some embodiments, the CHC can receive the request from a CH application executing on the user device.

In some embodiments, the CHC can determine availability of the wireless communications link to the wireless network over which to deliver the video stream to the user device periodically. In some embodiments, the CHC can determine availability of the wired communications link to the wired network over which to deliver the video stream to the user device periodically.

In some embodiments, the wireline performance measurement includes a wireline speed, a wireline bandwidth, a wireline throughput, a wireless received radio frequency ("RF") signal strength level, a wireline latency, or some combination thereof. In some embodiments, the wireless performance measurement includes a wireless speed, a wireless bandwidth, a wireless throughput, a wireless latency or some combination thereof.

In some embodiments, the CHC can receive the video stream from the CH video camera. The CHC can then deliver the video stream to the wireline communications link or to the wireless communications link based upon the selection.

It should be appreciated that the above-described subject matter may be implemented as a computer-controlled apparatus, a computer process, a computing system, or as an article of manufacture such as a computer-readable storage medium. These and various other features will be apparent from a reading of the remaining Detailed Description and a review of the associated drawings.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of reservations-based intelligent roadway traffic management will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 shown in FIG. 1 includes a connected home ("CH") premises 102. The CH premises 102 will be described herein as a residential structure such as a single-family home, duplex, triplex, condominium, apartment, or the like. It should be understood, however, that the concepts and technologies disclosed herein can be applied to other premises that might be or might include outdoor environments, stadiums, tents and other temporary structures, parking garages, commercial buildings, outdoor sales events, festivals, concerts, retail stores, restaurants, and/or the like.

The illustrated CH premises 102 includes one or more CH devices 104 controlled by a connected home controller ("CHC") 106 to provide a CH service for a user 108 who is associated with a user device 110 capable of communicating with the CHC 106 to enable the user 108 to interact with the CH devices 104. The CH service can be or can include a security service and/or a home automation service. The CH service can be a monitored or an unmonitored service.

The illustrated CH devices 104 include one or more CH sensor devices 112 and one or more CH video cameras 114. The CH sensor devices 112 can be or can include a motion sensor, a vibration sensor, an orientation sensor, a door sensor, a window sensor, a window break sensor, an outlet control sensor, a water leak sensor, a temperature sensor, a humidity sensor, a smoke detector sensor, a carbon monoxide detector sensor, an alarm sensor, a doorbell sensor, a multipurpose sensor that combines two or more sensors, the like, and/or combinations thereof. Although the CH sensor devices 112 can be utilized, at least in part, to provide sensor data (e.g., data indicative of motion detection, a door being opened, smoke or carbon monoxide present, a doorbell ring, and/or the like) for use in providing the CH service to the user 108, the concepts and technologies disclosed herein provide a capability of the CHC 106 to dynamically detect network availability for delivery of video captured by the CH video camera 114 to the user device 110. As such, data provided by the CH sensor devices 112 need not be used, but, in some embodiments, might be transmitted to the user device 110 prior to, along with, or after transmission of the video content to the user device 110. Moreover, the CH sensor devices 112 can be used to trigger video capture by the CH video camera 114. Those skilled in the art will appreciate the applicability of the CH sensor devices 112 to various aspects of CH services, and for this reason, additional details in this regard are not provided.

The illustrated CH video camera 114 includes one or more camera components 116. The camera components 116 can capture video, and additionally might capture still images. The camera components 116 can utilize any image sensor types to capture moving and optionally still images, some examples of which include a charge coupled device ("CCD") or a complementary metal oxide semiconductor ("CMOS") image sensor. The camera components 116 additionally can include a lens, an aperture, a flash, one or more physical controls (e.g., power button, record button, menu buttons, and/or the like), a housing that contains the other camera components, a screen for displaying content, a memory device for local storage of moving and still images, some combination thereof, and/or the like.

The CH video camera 114 can support one or more video resolutions, including, for example, Video Graphics Array ("VGA"), Wide VGA ("WVGA"), High Definition ("HD") 720, HD 1080, Quad HD ("QHD), Ultra HD ("UHD"), or some combination thereof. The CH video camera 114 can support one or more frame rates, including, for example, 24 frames per second ("fps"), 30 fps, 60 fps, or 120 fps. The CH video camera 114 can support one or more video file formats, including, for example, raw file formats, and camera-rendered file formats such as QUICKTIME, Moving Pictures Experts Group 4 ("MPEG-4"), Material eXchange Format ("MXF"), Audio Video Interleave ("AVI"), and the like. Additionally, camera settings such as white balance, aperture, ISO, filters, and the like are also contemplated.

The illustrated CH video camera 114 also includes a wired CHC connection interface 118 and a wireless CHC connection interface 120 that provide a wired and a wireless connection to the CHC 106, respectively. In particular, the wired CHC connection interface 118 provides a wired connection to a wired CH device connection interface 122 of the CHC 106, and the wireless CHC connection interface 120 provides a wireless connection to a wireless CH device connection interface 124 of the CHC 106. The CH video camera 114 can capture video and can provide the video to the CHC 106 via the wired CHC connection interface 118 and/or the wireless CHC connection interface 120.

The wired CHC connection interface 118 and the wired CH device connection interface 122 each can be or can include a proprietary wired interface or a standardized wired interface such as Ethernet, High Definition Media Interface ("HDMI"), Universal Serial Bus ("USB"), or the like. The wireless CHC connection interface 120 and the wireless CH device connection interface 124 each can be or can include a proprietary wireless interface or a standardized wireless interface. The wireless CHC connection interface 120 and the wireless CH device connection interface 124 each can operate in accordance with Institute of Electrical and Electronic Engineers ("IEEE") 802.11 standards, such as IEEE 802.11a, 802.11b, 802.11g, 802.11n, and draft/future 802.11 standards (referred to herein collectively as WI-FI). The wireless CHC connection interface 120 and the wireless CH device connection interface 124 can operate in accordance with BLUETOOTH, wireless USB, Z-Wave, ZIGBEE, or the like.

The illustrated CHC 106 also includes a CHC processing component 126, a CHC memory component 128, a wireless network interface 130, a wired network interface 132, a CHC application 134, and a CHC operating system 136. The CHC processing component 126 can include one or more hardware components that perform computations to process data, and/or to execute computer-executable instructions of one or more application programs such as the CHC application 134, one or more operating systems such as the CHC operating system 136, and/or other software. The CHC processing component 126 can include one or more central processing units ("CPUs") configured with one or more processing cores. The CHC processing component 126 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the CHC processing component 126 can include one or more discrete GPUs. In some other embodiments, the CHC processing component 126 can include CPU and GPU components that are configured in accordance with a co-processing CPU/GPU computing model, wherein the sequential part of an application executes on the CPU and the computationally-intensive part is accelerated by the GPU. The CHC processing component 126 can include one or more system-on-chip ("SoC") components along with one or more other components illustrated as being part of the CHC 106, including, for example, the CHC memory component 128. In some embodiments, the CHC processing component 126 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The CHC processing component 126 can be or can include one or more hardware components architected in accordance with an ARM architecture, available for license from ARM HOLDINGS of Cambridge, United Kingdom. Alternatively, the CHC processing component 126 can be or can include one or more hardware components architected in accordance with an x86 architecture, such an architecture available from INTEL CORPORATION of Mountain View, Calif., and others. Those skilled in the art will appreciate the implementation of the CHC processing component 126 can utilize various computation architectures, and as such, the CHC processing component 126 should not be construed as being limited to any particular computation architecture or combination of computation architectures, including those explicitly disclosed herein.

The CHC memory component 128 can include one or more hardware components that perform storage operations, including temporary or permanent storage operations. In some embodiments, the CHC memory component 128 can include volatile and/or non-volatile memory implemented in any method or technology for storage of information such as computer-readable instructions, data structures, program modules, the CHC operating system 136, the CHC application 134, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the CHC processing component 126.

The CHC application 134 can be executed by the CHC processing component 126 to perform operations to provide, at least, in part, the CH service to the user 108. The CHC application 134 can provide a user interface (not shown) accessible by the user 108 via the user device 110 via a dedicated application and/or via a web browser, and, in some embodiments, directly on the CHC 106. In the latter embodiment, the CHC 106 can include or can be connected to one or more displays (also not shown) configured to present in a visual manner the user interface. The user interface, whether accessed remotely via the user device 110 or directly on the CHC 106 can receive input from the user 108 to control the CH devices 104, including powering on/off, configuring settings, updating software/firmware, and otherwise controlling operations of the CH devices 104.

The CHC operating system 136 can control the operation of the CHC 106. In some embodiments, the CHC operating system 136 includes the functionality of the CHC application 134. The CHC operating system 136 can be executed by the CHC processing component 126 to cause the CHC 106 to perform various operations. The CHC operating system 136 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The CHC 106 is illustrated as being capable of operating on and in communication with a wireless access network 138 via a wireless communications link 140. The wireless access network 138 can include one or more radio access networks ("RANs"). A RAN can utilize various channel access methods including, but not limited to, Time Division Multiple Access ("TDMA"), Frequency Division Multiple Access ("FDMA"), Single Carrier FDMA ("SC-FDMA"), Code Division Multiple Access ("CDMA"), wideband CDMA ("W-CDMA"), Orthogonal Frequency Division Multiplexing ("OFDM"), Space Division Multiple Access ("SDMA"), and/or the like to provide a radio/air interface to the CHC 106 and to the user device 110. Data communications can be provided in part by General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), Long-Term Evolution ("LTE"), and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN, any combination thereof, and/or the like. A RAN can include various components such as, but not limited to, base transceiver stations ("BTSs"), Node-Bs or e-Node-Bs, base station controllers ("BSCs"), radio network controllers ("RNCs"), The illustrated wireless access network 138 is in communication with a wireless core network 142. The wireless core network 142 can be or can include an evolved packet core ("EPC") a circuit-switched core network ("CS CN"), a packet-switched core network ("PS CN"), an IP multimedia subsystem ("IMS") core network, multiples thereof, and/or combinations thereof. The wireless core network 142 can utilize one or more mobile telecommunications technologies, such as, but not limited to, Global System for Mobile communications ("GSM"), CDMA ONE, CDMA2000, Universal Mobile Telecommunications System ("UMTS"), LTE, Worldwide Interoperability for Microwave Access ("WiMAX"), other 802.XX technologies (e.g., 802.11 WI-FI), and the like.

The CHC 106 also is illustrated as being capable of operating on and in communication with a wireline network 144 via a wireline communications link 146. The wireline network 144 can be or can include one or more packet-switched networks. The wireline communications link 146 can be or can include any wireline cabling, some examples of which include coaxial cable and fiber optic cable. Those skilled in the art will appreciate the functionality of wireline networks, and as such, additional details in this regard are not described herein.

The wireline network 144 is also shown as being in communication with a monitoring center 148, which, in turn, is in communication with one or more emergency services 150. The monitoring center 148 can monitor the CHC 106 for emergency events (e.g., intruder, water leak, fire alarm, and/or the like) based upon data provided by the CH devices 104. In response to detecting an emergency event, personnel associated with the monitoring center 148 can communicate with the emergency services 150 on behalf of the user 108 to dispatch the police, fire, and/or emergency medical authorities to the connected home premises 102. Additionally, the monitoring center 148 can provide a notification of the dispatch to the user device 110 and/or the CHC 106 to notify the user 108 that emergency authorities have been dispatched to the CH premises 102. The notification can include a telephone call, a text message, an application notification, a combination thereof, and/or the like.

The monitoring center 148 also is in communication with a CH customer data center 152. The CH customer data center 152 can store one or more accounts 154 associated with customers, such as the user 108, of the CH service. The account(s) 154 can include personal information such as name, service address, billing address, telephone number, e-mail address, service description, billing information, and any other information associated with customers of the CH service.

Turning back to the wireless core network 142 and the wireline network 144, each is shown having one or more network elements 156, 158 that can be controlled by an SDN controller 160. The network elements 156, 158 can include switches, routers, hubs, repeaters, servers, gateways, combinations thereof, and the like. The wireless core network 142 can include one or more mobility management entities ("MMEs"), one or more serving gateways ("SGWs"), one or more packet data networks ("PDN") gateways ("PGWs"), and one or more home subscriber servers ("HSSs"). An MME controls signaling related to mobility and security for E-UTRAN access such as via the wireless access network 138. An SGW provides a point of interconnect between the radio-side (e.g., the wireless access network 138) and the EPC network (e.g., the wireless core network 142). An SGW serves the CHC controller 106 and the user device 110 by routing incoming and outgoing IP packets, including, for example, IP packets containing video data. A PGW interconnects the wireless core network 142 and one or more external IP networks (not shown). A PGW routes IP packets to and from the external IP networks. A PGW also performs operations such as IP address/IP prefix allocation, policy control, and charging. In some implementations, a PGW and an SGW are combined. An HSS is a database that contains user/subscriber information. An HSS also performs operations to support mobility management, call and session setup, user authentication, and access authorization.

As used herein, SDN is an architectural framework for creating intelligent networks that are programmable, application aware, and more open. The wireless core network 142, the wireline network 144, and/or the wireless access network 138 can utilize SDN concepts. SDN provides an agile and cost-effective communications platform for handling the dramatic increase in data traffic on networks by providing a high degree of scalability, security, and flexibility. SDN provides several benefits. SDN can allow for the creation of multiple virtual network control planes on common hardware. SDN can help extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OPENFLOW, available from Open Networking Foundation ("ONF").

In some embodiments, at least a portion of the network elements 156, 158 are created upon a network virtualization platform ("NVP") (not shown). An NVP is a shared infrastructure that can support multiple services and network applications, including non-real-time applications and real-time applications. The real-time applications can include a streaming video service provided as part of the CH service to video monitor the CH premises 102. The NVP can include a hardware resources that can be virtualized and managed by one or more virtual machine monitors ("VMMs") (also known as "hypervisors") to manage one or more virtual resources as abstractions of at least a portion of the hardware resources. These abstractions can be referred to as virtual machines ("VMs"). The VMs can execute one or more real-time applications to provide, at least in part, the streaming video service aspects of the CH service described herein.

The SDN controller 160 can control operations of the network elements 156, 158 based upon quality of service ("QoS") policies 162. In accordance with the concepts and technologies disclosed herein, the SDN controller 160 can utilize the QoS policies 162 that dictate different retransmission treatment for different types of data and video. The SDN controller 160 facilitates more granular QoS in the wireless core network 142 and the wireline network 144 by configuring the network elements 156, 158 with proper queue management and priority. For instance, video will be provided higher priority with higher prior queue assigned than other data transmission, and further the real-time ("live") streaming traffic will have a shorter buffer size to achieve lower latency while buffered streaming will have longer buffer size for more relaxed latency and retransmission scheme for guaranteed delivery.

Video delivery can take advantage of more flexible and more granular QoS treatment provided by SDN concepts. These more granular QoS treatments can be utilized to reduce the occurrence of TCP retransmission, and as a result, can save operator network bandwidth and improve delay performance. Moreover, TCP profiles can be created to allow per network (e.g., wired vs. wireless) and per application or group of applications treatment. These TCP profiles can be used to minimize unnecessary TCP retransmission on a particular type of TCP video delivery and slow-start to improve network bandwidth utilization and to reduce the latency of the video delivery to improve user experience.

Each of the QoS policies 162 can be associated with a QoS class identifier ("QCI"). Each QCI denotes a set of transport characteristics, including whether the bearer provides a guaranteed bit rate ("GBR"), priority, packet delay budget, and packet error loss rate, and is utilized to instruct the network elements 156, 158 to utilize specific parameters for controlling packet forwarding treatment (e.g., scheduling weights, admission thresholds, queue management thresholds, link-layer protocol configuration, and the like). The Third Generation Partnership Project ("3GPP") has defined, in 3GPP Release 8, nine QCIs, each associated with a preset set of transport characteristics according to the level of service required by various applications. TABLE 1 below shows the nine QCIs defined by 3GPP, including QCIs 6-9 that each are associated with video services that can be utilized as part of the CH service described herein to facilitate video content delivery from the CHC 106 to the user device 110.

TABLE 1

| QCI | Resource Type | Priority | Packet Delay Budget | Packet Error Loss | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video |
| 3 | GBR | 3 | 50 ms | $10^{-3}$ | Real Time Gaming |
| 4 | GBR | 5 | 300 ms | $10^{-6}$ | Non-Conversational Video (Buffered Streaming) |
| 5 | non-GBR | 1 | 100 ms | $10^{-6}$ | IMS Signaling |
| 6 | non-GBR | 6 | 300 ms | $10^{-6}$ | Video (Buffered Streaming) TCP-Based (for example, www, email, chat, ftp, p2p and the like) |
| 7 | non-GBR | 7 | 100 ms | $10^{-3}$ | Voice, Video (Live Streaming), Interactive Gaming |
| 8 | non-GBR | 8 | 300 ms | $10^{-6}$ | Video (Buffered Streaming) TCP-Based (for example, www, email, chat, ftp, p2p and the like) |
| 9 | non-GBR | 9 | 300 ms | $10^{-6}$ | Video (Buffered Streaming) TCP-Based (for example, www, email, chat, ftp, p2p and the like) |

In accordance with the concepts and technologies disclosed herein, additional QCIs can be used to enhance the granularity of current QoS for video services, and in particular live/real-time video services for delivery of video captured by the CH video camera 114 to differentiate between video transmitted via the wireless access network 138/wireless core network 142 and the wireline network 144. Other approaches using SDN match/action rules also could be leveraged to provide the more granular QoS.

There are at least two types of video delivery in general. One is real-time video using RTSP. The other is HLS (HTTP live streaming). Both use HTTP/TCP. The emphasis of RTSP is on real-time delivery. For example, security monitoring video needs real-time delivery. On the other hand, HLS applications, such as entertainment content, will need to guarantee the completeness of content, which needs to have mechanisms such as retransmission for packet loss. Due to the different nature of these services different treatment, e.g. regarding the TCP retransmission and/or slow start is required. RTSP/HTTP/TCP is the one application that dropping TCP retransmission is desirable. But HLS should not drop any retransmission when an ACK is not received from the network (either due to packet loss or long delay incurred in the network, e.g. in wireless network).

Slow start will not be triggered either in this case. Retransmissions should not be sent if subsequent video packets are scheduled. One way to distinguish the different types of HTTP/TCP applications is using a video delivery QoS tag (e.g., 1 for RTSP and 0 for HLS).

Turning back to the user device 110, the user device 110 includes a device processor 164, a device memory 166, a device operating system 168, a CH application 170, and a device display 172. The device processor 164 can include one or more hardware components that perform computations to process data, and/or to execute computer-executable instructions of one or more application programs such as the CH application 170, one or more operating systems such as the device operating system 168, and/or other software. The device processor 164 can include one or more CPUs configured with one or more processing cores. The device processor 164 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the device processor 164 can include one or more discrete GPUs. In some other embodiments, the device processor 164 can include CPU and GPU components that are configured in accordance with a co-processing CPU/GPU computing model, wherein the sequential part of an application executes on the CPU and the computationally-intensive part is accelerated by the GPU. The device processor 164 can include one or more SoC components along with one or more other components illustrated as being part of the user device 110, including, for example, the device memory 166. In some embodiments, the device processor 164 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The device processor 164 can be or can include one or more hardware components architected in accordance with an ARM architecture, available for license from ARM HOLDINGS of Cambridge, United Kingdom. Alternatively, the device processor 164 can be or can include one or more hardware components architected in accordance with an x86 architecture, such an architecture available from INTEL CORPORATION of Mountain View, Calif., and others. Those skilled in the art will appreciate the implementation of the device processor 164 can utilize various computation architectures, and as such, the device processor 164 should not be construed as being limited to any particular computation architecture or combination of computation architectures, including those explicitly disclosed herein.

The device memory 166 can include one or more hardware components that perform storage operations, including temporary or permanent storage operations. In some embodiments, the device memory 166 include volatile and/or non-volatile memory implemented in any method or technology for storage of information such as computer-readable instructions, data structures, program modules, the device operating system 168, the connected home application 170, or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the device processor 164.

The connected home application 170 can be executed by the device processor 164 to perform operations to provide, at least, in part, the connected home service to the user 108. The connected home application 170 can provide a user interface (not shown) through which the user 108 can receive input from the user 108 to control the connected home devices 104, including powering on/off, configuring settings, updating software/firmware, and otherwise controlling operations of the connected home devices 104.

The device operating system 168 can control the operation of the user device 110. In some embodiments, the device operating system 168 includes the functionality of the connected home application 170. The device operating system 168 can be executed by the device processor 164 to cause the user device 110 to perform various operations. The device operating system 168 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The device display 172 is an output device configured to present information in a visual form. In particular, the display 172 may present graphical user interface elements, text, images, video, notifications, virtual buttons, virtual keyboards, device status, time, date, calendar data, and any other information that is capable of being presented in a visual form. In some embodiments, the display 172 is a liquid crystal display ("LCD") utilizing any active or passive matrix technology and any backlighting technology (if used). In some embodiments, the display 172 is an organic light emitting diode ("OLED") display. Other display types are contemplated.

The illustrated device display 172 is shown presenting a video stream 174 that includes a video subject 176 captured by the CH video camera 114. The video subject 176 might be an intruder to the CH premises 102, a family member, a delivery person, or any other individual located at the CH premises 102 within view of the CH video camera 114 during the video stream 174. The CHC 106 can dynamically detect and select the best access technology (e.g., via the wireless access network 138 or the wireline network 144) for delivery of the video stream 174 to the user device 110.

It should be understood that some implementations of the operating environment 100 include multiple CH premises 102, multiple CHCs 106, multiple users 108, multiple user devices 110, multiple wired CHC connection interfaces 118, multiple wireless CHC connection interfaces 120, multiple wired CH device connection interfaces 122, multiple wireless CH device connection interface 124, multiple CHC operations systems 136, multiple wireless network interfaces 130, multiple wired network interfaces 132, multiple CHC processing components 126, multiple CHC memory components 128, multiple wireless access networks 138, multiple wireless communications links 140, multiple wireless core networks 142, multiple wireline networks 144, multiple wireline communications links 146, multiple monitoring centers 148, multiple CH customer data centers 152, multiple SDN controllers 160, multiple device processors 164, multiple device memory 166, multiple device operating systems 168, multiple CH applications 170, multiple device displays 172, multiple video streams 174, or some combination thereof. Thus, the illustrated embodiment should be understood as being illustrative, and should not be construed as being limiting in any way.

Figure 2:
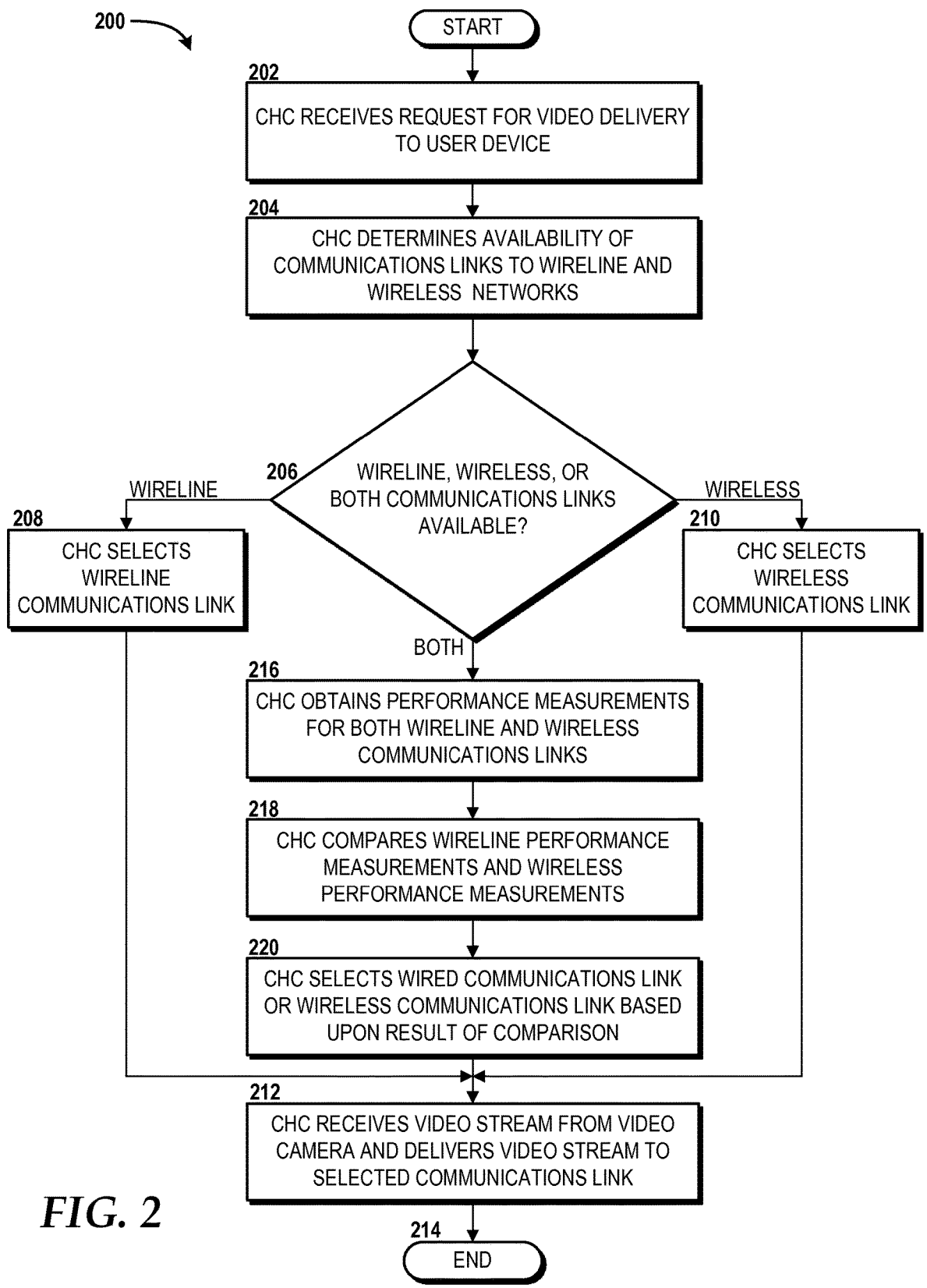
FIG. 2 is a flow diagram illustrating aspects of a method for selecting a network over which to deliver video captured by a video camera, according to an illustrative embodiment of the concepts and technologies disclosed herein.

Turning now to FIG. 2, a flow diagram illustrating aspects of a method 200 for selecting a network over which to deliver video captured by a video camera such as the CH video camera 114 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of the CHC 106, and/or one or more other computing systems and/or devices disclosed herein to perform operations.

For purposes of illustrating and describing some of the concepts of the present disclosure, the methods disclosed herein are described as being performed, at least in part, by the CHC 106 via execution of one or more software modules such as the CHC application 134. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202, where the CHC 106 receives a request for video delivery to the user device 110. In some embodiments, the CHC can receive the request for delivery of the video stream 174 to the user device in response to an event detected by a CH sensor device. In some embodiments, the CHC can receive the request from a CH application executing on the user device.

From operation 202, the method 200 proceeds to operation 204, where the CHC 106 determines availability of communications links to the wireline network 144 (e.g., the wireline communications link 146) and to the wireless access network 138 (e.g., the wireless communications link 140). Although operation 204 is illustrated as being performed in response to the request for video delivery received at operation 202, the determination operation at operation 204 can be performed periodically. From operation 204, the method 200 proceeds to operation 206. At operation 206, if the CHC 106 determines that only the wireline communications link 146 is available, the CHC 106 selects the wireline communications link 146 for video delivery at operation 208. If, however, the CHC 106 determines that only the wireless communications link 140 is available, the CHC 106 selects the wireless communications link 140 for video delivery at operation 210. The method 200 proceeds from 208 or 210 to operation 212, where the CHC 106 receives a video stream (e.g., the video stream 174) from the CH video camera 114 and delivers the video stream 174 to the selected communications link—that is, either the wireless communications link 140 or the wireline communications link 146—for delivery to the user device 110. From operation 212, the method 200 proceeds to operation 214, where the method 200 ends.

Returning to operation 206, if the CHC 106 determines that both the wireline communications link 146 and the wireless communications link 140 are available, the method 200 proceeds to operation 216, where the CHC 106 obtains performance measurements for both the wireline communications link 146 and the wireless communications link 140. The performance measurements can provide insight into the overall performance of a corresponding network such that the CHC 106 can select the best network for providing the video stream 174 to the user device 110. The performance measurements can include speed, bandwidth, throughput, and latency.

From operation 216, the method 200 proceeds to operation 218, where the CHC 106 compares the wireline performance measurements and the wireless performance measurements. From operation 218, the method 200 proceeds to operation 220, where the CHC 106 selects the wireline communications link 146 or the wireless communications link 140 based upon a result of the comparison performed at operation 218. From operation 220, the method 200 proceeds to operation 212, where the CHC 106 receives the video stream 174 from the connected home video camera 114 and delivers the video stream 174 to the selected communications link for delivery to the user device 110. From operation 212, the method 200 proceeds to operation 214, where the method 200 ends.

Figure 3:
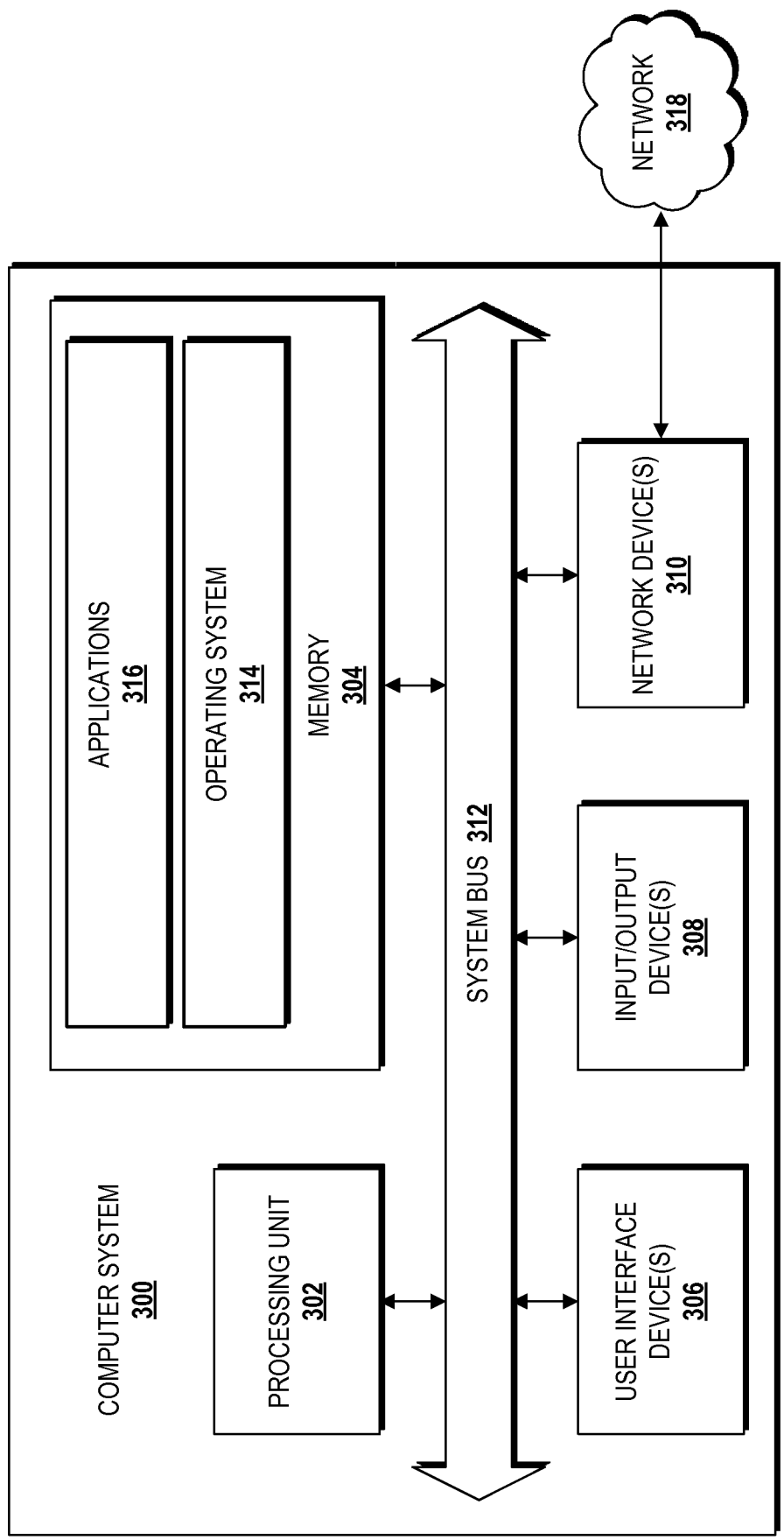
FIG. 3 is a block diagram illustrating an example computer system capable of implementing aspects of the embodiments presented herein.

FIG. 3 is a block diagram illustrating a computer system 300 configured to perform various operations disclosed herein. The computer system 300 includes a processing unit 302, a memory 304, one or more user interface devices 306, one or more input/output ("I/O") devices 308, and one or more network devices 310, each of which is operatively connected to a system bus 312. The system bus 312 enables bi-directional communication between the processing unit 302, the memory 304, the user interface devices 306, the I/O devices 308, and the network devices 310. In some embodiments, the CHC 106, the user device 110, the network elements 156, 158, the SDN controller 160, a system utilized in the monitoring center 148, a system utilized in the connected home customer data center 152, other systems disclosed herein, or some combination thereof is/are configured, at least in part, like the computer system 300. It should be understood, however, that the CHC 106, the user device 110, the network elements 156, 158, the SDN controller 160, a system utilized in the monitoring center 148, a system utilized in the connected home customer data center 152 may include additional functionality or include less functionality than now described.

The processing unit 302 (e.g., the CHC processing component 126 or the device processor 164) may be a standard central processor that performs arithmetic and logical operations, a more specific purpose programmable logic controller ("PLC"), a programmable gate array, or other type of processor known to those skilled in the art and suitable for controlling the operation of the computer system 300. Processing units are generally known, and therefore are not described in further detail herein.

The memory 304 (e.g., the CHC memory component 128 or the device memory 166) communicates with the processing unit 302 via the system bus 312. In some embodiments, the memory 304 is operatively connected to a memory controller (not shown) that enables communication with the processing unit 302 via the system bus 312. The illustrated memory 304 includes an operating system 314 (e.g., the CHC operating system 136 or the device operating system 168) and one or more applications 316 (e.g., the CHC application 134 or the CH application 170).

The operating system 314 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 304 may include one or more devices with which a user accesses the computer system 300. The user interface devices 304 may include, but are not limited to, computers, servers, personal digital assistants, telephones (e.g., cellular, IP, or landline), or any suitable computing devices. The I/O devices 308 enable a user to interface with the program modules. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, a touchscreen, or an electronic stylus. Further, the I/O devices 308 may include one or more output devices, such as, but not limited to, a display screen or a printer.

The network devices 310 enable the computer system 300 to communicate with other networks or remote systems via a network 318 (e.g., the wireless access network 138, the wireless core network 142, and/or the wireline network 144). Examples of the network devices 310 include, but are not limited to, a modem, a radio frequency ("RF") or infrared ("IR") transceiver, a telephonic interface, a bridge, a router, or a network card. The network 318 may include a wireless network such as, but not limited to, a WLAN such as a WI-FI network, a WWAN, a wireless PAN ("WPAN") such as BLUETOOTH, or a wireless MAN ("WMAN"). Alternatively, the network 318 may be a wired network such as, but not limited to, a WAN such as the Internet, a LAN such as the Ethernet, a wired PAN, or a wired MAN.

Figure 4:
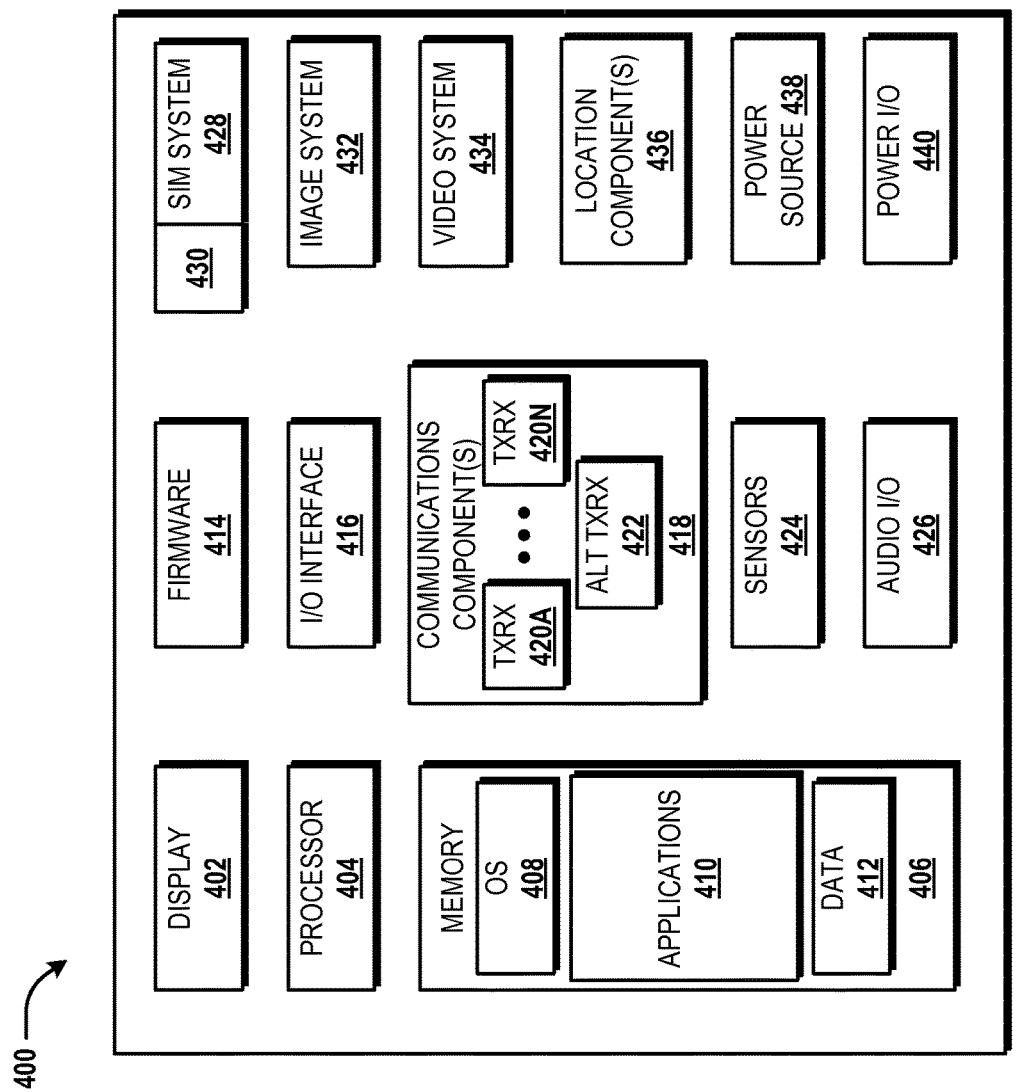
FIG. 4 is a block diagram illustrating an example mobile device capable of implementing aspects of the embodiments disclosed herein.

Turning now to FIG. 4, an illustrative mobile device 400 and components thereof will be described. In some embodiments, the user device 110 described above with reference to FIG. 1 can be configured as and/or can have an architecture similar or identical to the mobile device 400 described herein in FIG. 4. It should be understood, however, that the user device 110 may or may not include the functionality described herein with reference to FIG. 4. While connections are not shown between the various components illustrated in FIG. 4, it should be understood that some, none, or all of the components illustrated in FIG. 4 can be configured to interact with one another to carry out various device functions. In some embodiments, the components are arranged so as to communicate via one or more busses (not shown). Thus, it should be understood that FIG. 4 and the following description are intended to provide a general understanding of a suitable environment in which various aspects of embodiments can be implemented, and should not be construed as being limiting in any way.

As illustrated in FIG. 4, the mobile device 400 can include a display 402 (e.g., the device display 172) for displaying data. According to various embodiments, the display 402 can be configured to display network connection information, various graphical user interface ("GUI") elements (e.g., GUI elements of the CH application 170 or the CHC application 134), text, images, video, virtual keypads and/or keyboards, messaging data, notification messages, metadata, Internet content, device status, time, date, calendar data, device preferences, map and location data, combinations thereof, and/or the like. The mobile device 400 also can include a processor 404 (e.g., the device processor 164 or the CHC processing component 126) and a memory or other data storage device ("memory") 406 (e.g., the device memory 166 or the CHC memory component 128). The processor 404 can be configured to process data and/or can execute computer-executable instructions stored in the memory 406. The computer-executable instructions executed by the processor 404 can include, for example, an operating system 404 (e.g., the device operating system 168 or the CHC operating system 136), one or more applications 410, which may include the connected home application 170 or the CHC application 134, other computer-executable instructions stored in the memory 406, or the like. In some embodiments, the applications 410 also can include a UI application (not illustrated in FIG. 4).

The UI application can interface with the operating system 404 to facilitate user interaction with functionality and/or data stored at the mobile device 400 and/or stored elsewhere. In some embodiments, the operating system 404 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 404 to aid a user in data communications, entering/deleting data, entering and setting user IDs and passwords for device access, configuring settings, manipulating content and/or settings, multimode interaction, interacting with other applications 410, and otherwise facilitating user interaction with the operating system 404, the applications 410, and/or other types or instances of data 412 that can be stored at the mobile device 400. The data 412 can include, for example, the video stream 174, and/or any other data described herein.

The applications 410, the data 412, and/or portions thereof can be stored in the memory 406 and/or in a firmware 414, and can be executed by the processor 404. The firmware 414 also can store code for execution during device power up and power down operations. It can be appreciated that the firmware 414 can be stored in a volatile or non-volatile data storage device including, but not limited to, the memory 406 and/or a portion thereof.

The mobile device 400 also can include an input/output ("I/O") interface 416. The I/O interface 416 can be configured to support the input/output of data such as location information, presence status information, user IDs, passwords, and application initiation (start-up) requests. In some embodiments, the I/O interface 416 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 400 can be configured to synchronize with another device to transfer content to and/or from the mobile device 400. In some embodiments, the mobile device 400 can be configured to receive updates to one or more of the applications 410 via the I/O interface 416, though this is not necessarily the case. In some embodiments, the I/O interface 416 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 416 may be used for communications between the mobile device 400 and a network device or local device.

The mobile device 400 also can include a communications component 418. The communications component 418 can be configured to interface with the processor 404 to facilitate wired and/or wireless communications with one or more networks such as the wireless access network 138, the wireless core network 142, and the wireline network 144 described herein. In some embodiments, the communications component 418 includes a multimode communications subsystem for facilitating communications via the cellular network and one or more other networks.

The communications component 418, in some embodiments, includes one or more transceivers. The one or more transceivers, if included, can be configured to communicate over the same and/or different wireless technology standards with respect to one another. For example, in some embodiments, one or more of the transceivers of the communications component 418 may be configured to communicate using GSM, CDMAONE, CDMA2000, LTE, and various other 2G, 2.5G, 3G, 4G, 4.5G, and greater generation technology standards. Moreover, the communications component 418 may facilitate communications over various channel access methods (which may or may not be used by the aforementioned standards) including, but not limited to, TDMA, FDMA, W-CDMA, OFDM, SDMA, and the like.

In addition, the communications component 418 may facilitate data communications using GPRS, EDGE, the HSPA protocol family including HSDPA, EUL or otherwise termed HSUPA, HSPA+, and various other current and future wireless data access standards. In the illustrated embodiment, the communications component 414 can include a first transceiver ("TxRx") 420A that can operate in a first communications mode (e.g., GSM). The communications component 418 also can include an $N^{th}$ transceiver ("TxRx") 420N that can operate in a second communications mode relative to the first transceiver 420A (e.g., UMTS). While two transceivers 420A-420N (hereinafter collectively and/or generically referred to as "transceivers 420") are shown in FIG. 4, it should be appreciated that less than two, two, and/or more than two transceivers 420 can be included in the communications component 418.

The communications component 418 also can include an alternative transceiver ("Alt TxRx") 422 for supporting other types and/or standards of communications. According to various contemplated embodiments, the alternative transceiver 422 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 418 also can facilitate reception from terrestrial radio networks, digital satellite radio networks, internet-based radio service networks, combinations thereof, and the like. The communications component 418 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 400 also can include one or more sensors 424. The sensors 424 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 400 may be provided by an audio I/O component 426. The audio I/O component 426 of the mobile device 400 can include one or more speakers for the output of audio signals, one or more microphones for the collection and/or input of audio signals, and/or other audio input and/or output devices.

The illustrated mobile device 400 also can include a subscriber identity module ("SIM") system 424. The SIM system 424 can include a universal SIM ("USIM"), a universal integrated circuit card ("UICC") and/or other identity devices. The SIM system 424 can include and/or can be connected to or inserted into an interface such as a slot interface 430. In some embodiments, the slot interface 430 can be configured to accept insertion of other identity cards or modules for accessing various types of networks. Additionally, or alternatively, the slot interface 430 can be configured to accept multiple subscriber identity cards. Because other devices and/or modules for identifying users and/or the mobile device 400 are contemplated, it should be understood that these embodiments are illustrative, and should not be construed as being limiting in any way.

The mobile device 400 also can include an image capture and processing system 432 ("image system"). The image system 432 can be configured to capture or otherwise obtain photos, videos, and/or other visual information. As such, the image system 432 can include cameras, lenses, charge-coupled devices ("CCDs"), combinations thereof, or the like. The mobile device 400 may also include a video system 434. The video system 434 can be configured to capture, process, record, modify, and/or store video content. Photos and videos obtained using the image system 432 and the video system 434, respectively, may be added as message content to an MMS message, email message, and sent to another device. The video and/or photo content also can be shared with other devices via various types of data transfers via wired and/or wireless communication devices as described herein.

The mobile device 400 also can include one or more location components 436. The location components 436 can be configured to send and/or receive signals to determine a geographic location of the mobile device 400. According to various embodiments, the location components 436 can send and/or receive signals from global positioning system ("GPS") devices, assisted-GPS ("A-GPS") devices, WI-FI/WIMAX and/or cellular network triangulation data, combinations thereof, and the like. The location component 436 also can be configured to communicate with the communications component 414 to retrieve triangulation data for determining a location of the mobile device 400. In some embodiments, the location component 436 can interface with cellular network nodes, telephone lines, satellites, location transmitters and/or beacons, wireless network transmitters and receivers, combinations thereof, and the like. In some embodiments, the location component 436 can include and/or can communicate with one or more of the sensors 424 such as a compass, an accelerometer, and/or a gyroscope to determine the orientation of the mobile device 400. Using the location component 436, the mobile device 400 can generate and/or receive data to identify its geographic location, or to transmit data used by other devices to determine the location of the mobile device 400. The location component 436 may include multiple components for determining the location and/or orientation of the mobile device 400.

The illustrated mobile device 400 also can include a power source 434. The power source 434 can include one or more batteries, power supplies, power cells, and/or other power subsystems including alternating current ("AC") and/or direct current ("DC") power devices. The power source 434 also can interface with an external power system or charging equipment via a power I/O component 440. Because the mobile device 400 can include additional and/or alternative components, the above embodiment should be understood as being illustrative of one possible operating environment for various embodiments of the concepts and technologies described herein. The described embodiment of the mobile device 400 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 400 or other devices or computers described herein, such as the computer system 400 described above with reference to FIG. 4. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 400 in order to store and execute the software components presented herein. It is also contemplated that the mobile device 400 may not include all of the components shown in FIG. 4, may include other components that are not explicitly shown in FIG. 4, or may utilize an architecture completely different than that shown in FIG. 4.

Based on the foregoing, it should be appreciated that concepts and technologies for real-time video delivery for CH applications have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A connected home controller comprising:
   a wireless network interface that connects the connected home controller to a wireless network;
   a wired network interface that connects the connected home controller to a wireline network;
   a connected home device connection interface that connects the connected home controller to a connected home video camera;
   a processor; and
   a memory having computer-executable instructions stored thereon that, when executed by the processor, cause the processor to perform operations comprising
      receiving a request for delivery, to a user device, of a video stream captured by the connected home video camera,
      determining availability of a wireline communications link to the wireline network over which to deliver the video stream to the user device,
      determining availability of a wireless communications link to the wireless network over which to deliver the video stream to the user device, and
      in response to determining that the wireline communications link and the wireless communications link are available,
         obtaining a wireline performance measurement for the wireline communications link,
         obtaining a wireless performance measurement for the wireline communications link,
         comparing the wireline performance measurement and the wireless performance measurement, and
         selecting one of the wireline communications link to the wireline network or the wireless communications link to the wireless network for delivery of the video stream based upon the comparing,
         wherein a network element of the wireline network and a network element of the wireless network are controlled by a software-defined networking controller,
         wherein the software-defined networking controller controls operation of the network element of the wireline network based upon a first quality of service policy to determine handling of delivery of the video stream using Transfer Control Protocol ("TCP") by the network element of the wireline network if the video stream is received, via the wireline communications link, by the network element of the wireline network and controls operation of the network element of the wireless network based upon a second quality of service policy to determine handling of delivery of the video stream using TCP by the network element of the wireless network if the video stream is received, via the wireless communications link, by the network element of the wireless network,
         wherein the first quality of service policy dictates a first retransmission treatment of the video stream utilizing TCP retransmission in association with the video stream based on the video stream being delivered by the wireline network, and
         wherein the second quality of service policy dictates a second retransmission treatment of the video stream dropping TCP retransmission in association with the video stream based on the video stream being delivered by the wireless network and in response to determining, based at least in part on a video delivery quality of service tag, that the video stream is associated with a real-time streaming protocol using TCP instead of a buffered streaming protocol.

2. The connected home controller of claim 1, wherein determining availability of the wireline communications link to the wireline network over which to deliver the video stream to the user device and determining availability of the wireless communications link to the wireless network over which to deliver the video stream to the user device are performed in response to receiving the request for delivery of the video stream to the user device.

3. The connected home controller of claim 1, wherein receiving the request for delivery of the video stream to the user device is in response to an event detected by a connected home sensor device under control of the connected home controller via the connected home device connection interface.

4. The connected home controller of claim 1, wherein receiving the request for delivery of the video stream to the user device comprises receiving the request from a connected home application executing on the user device.

5. The connected home controller of claim 1, wherein determining availability of the wireline communications link to the wireline network over which to deliver the video stream to the user device and determining availability of the wireless communications link to the wireless network over which to deliver the video stream to the user device are performed periodically.

6. The connected home controller of claim 1, wherein the wireline performance measurement comprises a wireline speed, a wireline bandwidth, a wireline throughput, or a wireline latency; and wherein the wireless performance measurement comprises a wireless speed, a wireless bandwidth, a wireless throughput, or a wireless latency.

7. The connected home controller of claim 1, wherein the operations further comprise:
   receiving the video stream from the connected home video camera; and
   delivering the video stream to the wireline communications link or the wireless communications link based upon the selecting.

8. A computer-readable storage medium having computer-executable instructions stored thereon that, when executed by a processor of a connected home controller, causes the connected home controller to perform operations comprising:

receiving a request for delivery, to a user device, of a video stream captured by a connected home video camera;

determining availability of a wireline communications link to a wireline network over which to deliver the video stream to the user device;

determining availability of a wireless communications link to a wireless network over which to deliver the video stream to the user device; and in response to determining that the wireline communications link and the wireless communications link are available, obtaining a wireline performance measurement for the wireline communications link, obtaining a wireless performance measurement for the wireline communications link, comparing the wireline performance measurement and the wireless performance measurement, and selecting one of the wireline communications link to the wireline network or the wireless communications link to the wireless network for delivery of the video stream based upon the comparing, wherein a network element of the wireline network and a network element of the wireless network are controlled by a software-defined networking controller, wherein the software-defined networking controller controls operation of the network element of the wireline network based upon a first quality of service policy to determine handling of delivery of the video stream using Transfer Control Protocol ("TCP") by the network element of the wireline network if the video stream is received, via the wireline communications link, by the network element of the wireline network and controls operation of the network element of the wireless network based upon a second quality of service policy to determine handling of delivery of the video stream using TCP by the network element of the wireless network if the video stream is received, via the wireless communications link, by the network element of the wireless network, wherein the first quality of service policy dictates a first retransmission treatment of the video stream utilizing TCP retransmission in association with the video stream based on the video stream being delivered by the wireline network, and wherein the second quality of service policy dictates a second retransmission treatment of the video stream dropping TCP retransmission in association with the video stream based on the video stream being delivered by the wireless network and in response to determining, based at least in part on a video delivery quality of service tag, that the video stream is associated with a real-time streaming protocol using instead of a buffered streaming protocol.

9. The computer-readable storage medium of claim 8, wherein determining availability of the wireline communications link to the wireline network over which to deliver the video stream to the user device and determining availability of the wireless communications link to the wireless network over which to deliver the video stream to the user device are performed in response to receiving the request for delivery of the video stream to the user device.

10. The computer-readable storage medium of claim 8, wherein receiving the request for delivery of the video stream to the user device is in response to an event detected by a connected home sensor device under control of the connected home controller.

11. The computer-readable storage medium of claim 8, wherein receiving the request for delivery of the video stream to the user device comprises receiving the request from a connected home application executing on the user device.

12. The computer-readable storage medium of claim 8, wherein determining availability of the wireline communications link to the wireline network over which to deliver the video stream to the user device and determining availability of the wireless communications link to the wireless network over which to deliver the video stream to the user device are performed periodically.

13. The computer-readable storage medium of claim 8, wherein the wireline performance measurement comprises a wireline speed, a wireline bandwidth, a wireline throughput, or a wireline latency; and wherein the wireless performance measurement comprises a wireless speed, a wireless bandwidth, a wireless throughput, or a wireless latency.

14. The computer-readable storage medium of claim 8, wherein the operations further comprise:

receiving the video stream from the connected home video camera; and delivering the video stream to the wireline communications link or the wireless communications link based upon the selecting.

15. A method comprising:

receiving, by a connected home controller, a request for delivery, to a user device, of a video stream captured by a connected home video camera;

determining, by the connected home controller, availability of a wireline communications link to a wireline network over which to deliver the video stream to the user device;

determining, by the connected home controller, availability of a wireless communications link to a wireless network over which to deliver the video stream to the user device; and in response to determining that the wireline communications link and the wireless communications link are available, obtaining, by the connected home controller, a wireline performance measurement for the wireline communications link, obtaining, by the connected home controller, a wireless performance measurement for the wireline communications link, comparing, by the connected home controller, the wireline performance measurement and the wireless performance measurement, and selecting, by the connected home controller, one of the wireline communications link to the wireline network or the wireless communications link to the wireless network for delivery of the video stream based upon the comparing, wherein a network element of the wireline network and a network element of the wireless network are controlled by a software-defined networking controller, wherein the software-defined networking controller controls operation of the network element of the wireline network based upon a first quality of service policy to determine handling of delivery of the video stream using Transfer Control Protocol ("TCP") by the network element of the wireline network if the video stream is received, via the wireline communications link, by the network element of the wireline network and controls operation of the network element of the wireless network based upon a second quality of service policy to determine handling of delivery of the video stream using TCP by the network element of the wireless network if the video stream is received, via the wireless communications link, by the network element of the wireless network, wherein the first quality of service policy dictates a first retransmission treatment of the video stream utilizing TCP retransmission in association with the video stream based on the video stream being delivered by the wireline network, and wherein the second quality of service policy dictates a second retransmission treatment of the video stream dropping TCP retransmission in association with the video stream based on the video stream being delivered by the wireless network and in response to determining, based at least in part on a video delivery quality of service tag, that the video stream is associated with a real-time streaming protocol using TCP instead of a buffered streaming protocol.

16. The method of claim 15, wherein determining availability of the wireline communications link to the wireline network over which to deliver the video stream to the user device and determining availability of the wireless communications link to the wireless network over which to deliver the video stream to the user device are performed in response to receiving the request for delivery of the video stream to the user device.

17. The method of claim 15, wherein receiving the request for delivery of the video stream to the user device is in response to an event detected by a connected home sensor device under control of the connected home controller.

18. The method of claim 15, wherein receiving the request for delivery of the video stream to the user device comprises receiving the request from a connected home application executing on the user device.

19. The method of claim 15, wherein the wireline performance measurement comprises a wireline speed, a wireline bandwidth, a wireline throughput, or a wireline latency; and wherein the wireless performance measurement comprises a wireless speed, a wireless bandwidth, a wireless throughput, or a wireless latency.

20. The method of claim 15, further comprising
receiving, by the connected home controller, the video stream from the connected home video camera; and
delivering, by the connected home controller, the video stream to the wireline communications link or the wireless communications link based upon the selecting.

* * * * *